Sept. 8, 1959 R. L. GLASS 2,902,860
SUBMERSIBLE THERMOMETER AND SUPPORTING MEANS THEREFOR
Filed Jan. 23, 1957
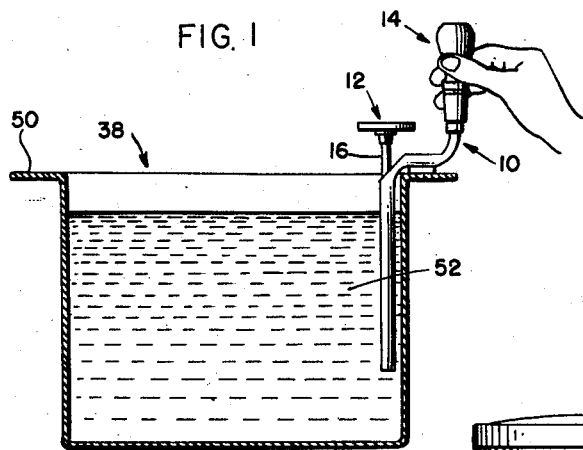
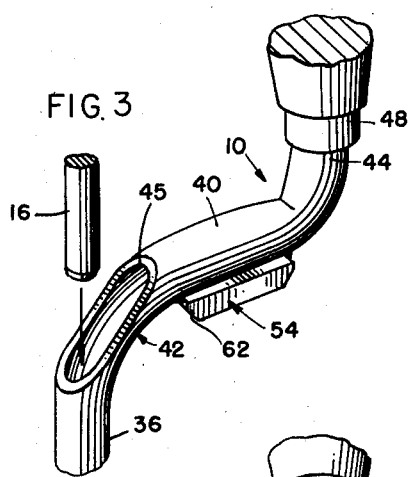
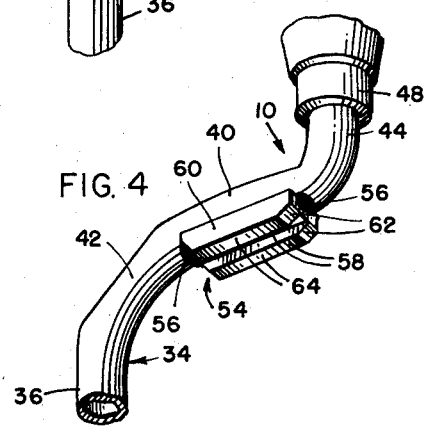
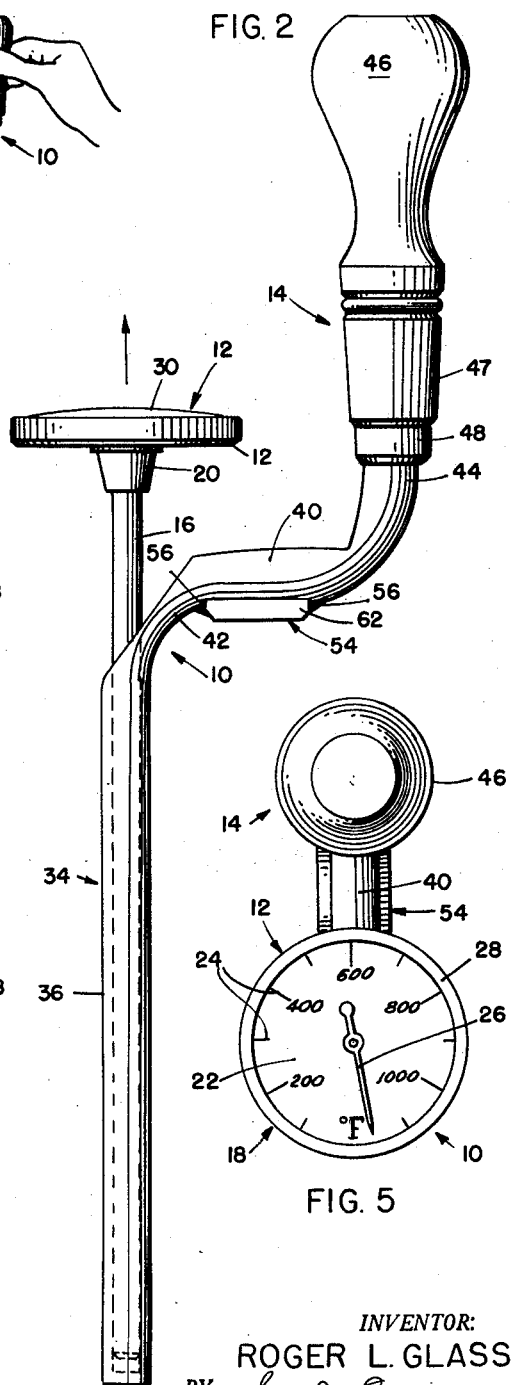
INVENTOR:
ROGER L. GLASS
BY *Fred Gerlach*
ATT'Y United States Patent Office 2,902,860
Patented Sept. 8, 1959

2,902,860

SUBMERSIBLE THERMOMETER AND SUPPORTING MEANS THEREFOR

Roger L. Glass, Vincennes, Ind.

Application January 23, 1957, Serial No. 635,627

3 Claims. (Cl. 73—343)

The present invention relates to improvements in thermometers and more particularly to thermometers of the stem and dial type having associated therewith improved supporting means whereby the same may be supported on or from the open rim of a liquid-containing receptacle with the stem being partially submerged within the body of liquid in the receptacle and with the dial case held above the liquid level for convenient reading of the dial indication.

The improved thermometer and supporting means therefor comprising the present invention has been designed for use primarily in connection with the temperature indication of molten metal in the metal pots of Linotype or other similar type casting machines wherein it is necessary to maintain the molten metal at a predetermined temperature, usually in the neighborhood of 550° F. Such metal pots are ordinarily provided with gas or electric heaters which are operable under the control of one or more thermostats to maintain the liquid in the pot at the desired temperature level. Such thermostats must, of course, be adjusted or set initially at the desired temperature level and the setting thereof must be checked for correction from time to time. Heretofore, it has been the standard practice to utilize a portable and conventional thermometer device of the stem and dial type including a thermometer proper in which the stem portion thereof is in the form of a tube containing a single bimetallic helix or plural coaxial bimetallic helices operatively connected to the dial pointer within the dial case at one end of the tube. For convenient manipulation of the thermometer proper, a generally L-shaped combination thermometer sheath and handle having converging legs disposed at approximately a 90° angle has one leg thereof in the form of a sheath for telescopic reception of the thermometer stem and has a wooden or other heat insulating handle at the free end of the other leg whereby the entire thermometer device may be manually supported with the sheath and its contained thermometer stem partially immersed in the body of molten metal and with the handle closely overlying an edge of the pot.

Temperature measuring apparatus of the character briefly outlined above is subject to at least one serious limitation in use, namely, that in maintaining the thermometer stem submerged, the handle must be held at a region of extremely high atmospheric temperature during the entire period of heat assimilation by the thermometer as well as during the time required to take a reading of the dial indication. This procedure is not only uncomfortable to the operator but, in certain instances where the operator is possessed of heat-sensitive hands, it has been necessary to employ an asbestos or other heat shielding glove or, alternatively, to shift the handle from one hand to the other during thermometer manipulation. Indeed, in certain instances, assimilation of heat by the hand of the operator has been so severe that the entire temperature measuring instrument has been dropped into the pot and submerged in the molten metal so that a temporary shutting down of the machine has been necessary while the instrument, less the charred or otherwise consumed handle portion thereof, has been "fished" from the pot.

The present invention is designed to overcome the above-noted limitation that is attendant upon the construction and use of conventional temperature measuring instruments employed in connection with Lintoype machines as set forth above and, toward this end, it contemplates the provision of an improved form of thermometer assembly having associated therewith magnetic means whereby the assembly may be operatively positioned in the vicinity of the receptacle for temperature measuring purposes and the hand withdrawn during the time necessary for proper heat-assimilation by the thermometer proper and for a reading of the dial indication. The invention further contemplates the provision of such a thermometer assembly having novel shape characteristics which facilitate placement of the assembly in operative position in and on the molten metal-containing receptacle without exposing as large an area of the skin to the hot atmosphere in the vicinity of the receptacle as has heretofore been necessary, even during the brief interval of time required to effect such placement prior to withdrawal of the hand. Still further, the invention contemplates the provision of a thermometer assembly capable of magnetic attachment to the rim portion of the pot or receptacle and which, when so attached, is maintained in a state of stable equilibrium independently of the magnetic attachment means so that there will be no adversely acting forces on the magnetic field of the permanent magnet associated with the device tending to dislodge the assembly from its magnetically secured position.

Although the invention has been designed primarily for use in connection with Linotype or other casting machine operations, it will be understood that the same will be found useful in other fields, as for example, in measuring the temperature of photographic developing and fixing solutions, in die casting processes, and in measuring the temperature of contained liquid solutions, emulsions and the like wherever the container for the liquid possesses a ferrous content capable of magnetic attraction. Irrespective, however, of the particular use to which the invention may be put, the essential features thereof are at all times preserved.

Other objects and advantages of the invention, not at this time enumerated, will become more readily apparent as the following description ensues.

In the accompanying single sheet of drawing forming a part of this specification, a preferred embodiment of the invention has been shown.

In this drawing:

Fig. 1 is a side elevational view of a thermometer assembly constructed in accordance with the principles of the present invention as it appears when operative associated with a molten metal-containing receptacle and showing the manner in which the same is manually placed in such position;

Fig. 2 is an enlarged side elevational view of the assembly shown in Fig. 1;

Fig. 3 is an exploded fragmentary perspective view of the medial region of the assembly;

Fig. 4 is a fragmentary perspective view of the medial region of the medial regions of the thermometer-support from which the thermometer proper has been removed and showing in detail the magnetic attaching means whereby the same may be mounted on a molten metal or other liquid-containing receptacle; and Fig. 5 is an end elevational view of the structure shown in Fig. 2.

Referring now to the drawing in detail, the thermometer assembly of the present invention is designated in its entirety at 10 and is comprised of two principal assemblies, namely, a thermometer assembly proper 12 and a combined thermometer support and handle 14. The thermometer assembly proper 12 is of more or less conventional design and construction and is of the stem and dial type including an elongated tubular sealed stem 16 which is closed at its free end and the other end of which is sealingly connected to a dial casing 18 of generally circular transverse cross section, the seal being effected by means of a circular flange or boss 20 provided centrally on the casing 18 and into which the end of the stem 16 extends. The dial casing assembly includes the usual dial face 22 on which there is printed or otherwise provided dial indications 24 designed for cooperation with a movable radially extending pointer 26. The dial casing is sealed by a bezel ring 28 containing a transparent glass or other crystal 30 and having its rim flanged as at 32 over the rear portion of the dial casing 18. It will be understood that the thermometer assembly 12 further includes conventional internal mechanism including a bimetallic helix or plural bimetallic helices within the stem 16 and operatively connected in the usual manner to the pointer 26 whereby distortion of the helix due to thermal expansion thereof will cause the pointer to give a true indication on the scale 24 of the ambient temperature.

The combined thermometer support and handle assembly 14 is in the form of an irregular shaped tubular metal rod 34 having an elongated sheath portion 36 which extends vertically when the assembly is in its operative position on a Linotype pot or other receptacle such as has been shown at 38 in Fig. 1. The rod 34 further includes a short horizontal portion 40, an interconnecting inclined portion 42 and a vertical handle portion 44 which extends in parallelism with the sheath portion 36. The upper side wall of the inclined portion 42 is cut away or relieved as at 45 to expose the interior or the sheath portion 36 and to thus permit telescopic reception therein of the stem portion 16 of the thermometer proper 10 which may be introduced into and removed from the sheath portion 36 at will. The free end of the handle portion 44 carries a suitable heat insulating handle 46 which may be telescopically received over the end of the handle portion 44 and which may be reenforced and secured on the latter portion by means of a suitable attachment ferrule 48.

As shown in Fig. 1, the assembly thus far described is adapted to be supported on the flat rim portion 50 of the receptacle 38 with the horizontal portion 40 closely overlying the rim and with the sheath portion 36 and its contained thermometer stem 16 extending downwardly and vertically into the interior of the receptacle so that these parts will be at least partially submerged in the body of molten metal 52 or other liquid contained within the receptacle and the temperature of which is to be measured. In order to releasably anchor the medial horizontal portion 40 of the combined support and handle 14 securely in position on the rim 58, a permanent magnet 54 is affixed in any suitable manner as by welding at 56 to the underneath side of the portion 40. The magnet 54 may be formed of "Alnico 5" or other magnetizeable material and is preferably of flat rectangular configuration as best seen in Fig. 4 and having relatively shallow elongated pole pieces 58 depending from the body portion 60 of the magnet. The corners of the pole pieces 58 are truncated or bevelled as at 62 and afford therebetween a pair of flat rim-engaging surfaces 64 adapted to rest squarely on the rim 58 when the assembly is in its operative temperature-measuring position on the receptacle 38.

When the thermometer assembly 10 is in temperature measuring position on the receptacle 10, it is positioned as illustrated in Fig. 1 and the dial casing 18 is adjusted by turning the shank 16 within the sheath portion 36 of the part 34 so that the dial face 22 is readily visible and oriented for ready reading by the operator of the machine. Since the two flat surfaces 64 rest squarely on the rim 58 of the receptacle 38, a closed magnetic path for the field of the magnet 54 is provided and the magnet is firmly held by magnetic attraction in position on the rim. Disregarding for the moment the attractive force of the magnet 54, it will be observed that the entire assembly 10 is positioned in a state of stable equilibrium wherein the same is balanced on the rim 58. Thus with the assembly in position on the receptacle 38 there are no forces in existence which will tend to oppose the attractive influence of the magnet and the assembly will be securely maintained against dislodgment.

As shown in Fig. 1, the thermometer assembly 10 may be quickly and easily applied to the receptacle or pot 38 by grasping the handle 46 between the thumb and the first and second fingers of the hand and the assembly projected or thrust, so to speak, forwardly and downwardly into its operative position and immediately thereafter released and the hand withdrawn from the high temperature atmospheric region surrounding the receptacle 38. The remainder of the hand need not be projected into close proximity with the receptacle and, after the hand is withdrawn, the assembly 10 may be allowed to remain in its operative position while heat is assimilated by the sheath 36 and stem 16 and until after the operator has had time to make a reading of the dial indication. Thereafter, the assembly may be quickly removed by a reversal of the process outlined above.

In compliance with title 35, U.S. Code, section 22, a preferred embodiment of the invention has been shown in the drawings and described herein. It should be understood, however, that the invention is not to be limited to the exact arrangement of parts shown in the accompanying drawing or described in this specification as various changes in the details of construction may be resorted to without departing from the spirit of the invention. For example, whereas the receptacle 38 illustrated herein is shown as being formed in its entirety of metal having a ferrous content capable of being attracted by the magnet 54, it is within the scope of the present invention, where receptacles not having such a ferrous content are concerned, to affix to the rim portion thereof or to embed therein a small ferrous metal plate or insert to which the magnet may be attracted. The claims, therefore, should be construed as broadly as the prior art will permit.

Having thus described the invention what I claim as new and desire to secure by Letters Patent is:

1. A thermometer assembly designed for use in measuring the temperature of liquid contained within a receptacle having a ferrous content capable of attraction by a magnet and provided with an upper open rim portion, said assembly including a stem and dial type thermometer proper including an elongated tubular stem portion closed at one end and having a dial casing sealingly mounted on the other end thereof in operative relationship, and a combined support and handle member for said thermometer proper in the form of an irregularly shaped tubular member having an elongated straight linear sheath portion at one end, an elongated straight linear handle portion at the other end parallel to and offset laterally from said sheath portion, a short transverse portion merging with the inner end of the handle portion and extending substantially at a right angle thereto, and a short inclined portion connecting and merging with said transverse and sheath portions, the wall of said inclined portion being relieved to expose the adjacent end of said sheath portion whereby the latter may telescopically and removably receive therein the end of the stem portion of the thermometer proper, and a heat insulating handle proper mounted on the free end of said handle portion, the respective masses of said sheath and handle portions including the handle proper, and the mass of said thermometer proper being such and being so distributed relative to one another that said transverse portion may be supported and balanced on the rim of said receptacle with the sheath portion and thermometer stem extending vertically downwardly into the receptacle substantially within the vertical confines of the latter and with the handle portion including the handle proper extending vertically upwardly substantially outside said vertical confines and with the thermometer assembly as a whole assuming a balanced position of stable equilibrium, said transverse portion including means establishing a magnetic field whereby the transverse portion may be magnetically attracted to the rim of the receptacle with the transverse portion thus balanced on the latter.

2. A thermometer assembly as set forth in claim 1 wherein said field-establishing means comprises a permanent magnet fixedly secured to the underneath side of said transverse portion, said magnet constituting the sole supporting means for the assembly on said rim of the receptacle.

3. A thermometer assembly as set forth in claim 1 wherein said field-establishing means comprises a permanent magnet secured by welding to the underneath side of said transverse portion, said magnet being provided with a pair of depending pole pieces each presenting a flat and appreciably expansive rim-engaging supporting surface.

References Cited in the file of this patent
UNITED STATES PATENTS

| | | |
|---|---|---|
| 49,602 | Brear | Aug. 29, 1865 |
| 2,293,276 | Brown | Aug. 2, 1940 |
| 2,354,932 | Walker | Aug. 1, 1941 |
| 2,573,205 | Lamb | Oct. 30, 1951 |